United States Patent [19]

Shanklin

[11] Patent Number: 4,627,334

[45] Date of Patent: Dec. 9, 1986

[54] PORTABLE, NESTABLE BEVERAGE BREWING SYSTEM

[76] Inventor: William C. Shanklin, 4105 N. 39th, Tacoma, Wash. 98407

[21] Appl. No.: 804,685

[22] Filed: Dec. 3, 1985

[51] Int. Cl.[4] .................................................. A47J 31/02
[52] U.S. Cl. ........................................... 99/306; 220/8; 426/77
[58] Field of Search ................ 99/304, 306, 295, 316, 99/317, 323, 279; 222/153, 548, 565; 220/8; 426/433, 77, 86; 210/474, 455

[56] References Cited

U.S. PATENT DOCUMENTS

| | | | |
|---|---|---|---|
| 2,716,937 | 9/1955 | Milano | 99/295 X |
| 2,732,787 | 1/1956 | Osborne | 99/295 X |
| 2,743,664 | 5/1956 | Dale | 99/295 |
| 3,695,168 | 10/1972 | Van Brunt | 99/306 |
| 3,811,373 | 5/1974 | Telco | 99/295 |
| 3,822,013 | 7/1974 | Van Der Veken | 206/223 |
| 4,027,582 | 6/1977 | O'Connell | 99/306 |
| 4,069,751 | 1/1978 | Gronwick et al. | 99/306 |
| 4,417,504 | 11/1983 | Yamamoto | 99/306 |
| 4,446,158 | 5/1984 | English et al. | 426/79 |
| 4,487,114 | 12/1984 | Abdenour | 99/295 |
| 4,520,716 | 6/1985 | Hayes | 99/295 |

FOREIGN PATENT DOCUMENTS 1289610  2/1962  France ........................ 99/295

Primary Examiner—Billy J. Wilhite
Attorney, Agent, or Firm—Klarquist, Sparkman, Campbell, Leigh & Whinston

[57] ABSTRACT

A portable, nestable brewing system for the preparation of various liquid beverage products is disclosed. The system includes as its main components an insulated cup-like brewed beverage receiver, a water receiving vessel, a filter holder, and a powdered beverage storage canister with a detachable lid. The brewed beverage receiver, water receiving vessel, and filter holder engage together in a configuration enabling the preparation of brewed beverages from powdered materials. After use, all of the components and the powdered beverage storage canister are nestable within the brewed beverage receiver. To maintain the system in a nested condition, the lid of canister is detachably securable to the top of the brewed beverage receiver with the other components of the system inside.

22 Claims, 12 Drawing Figures

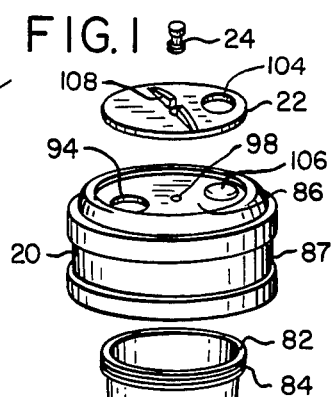
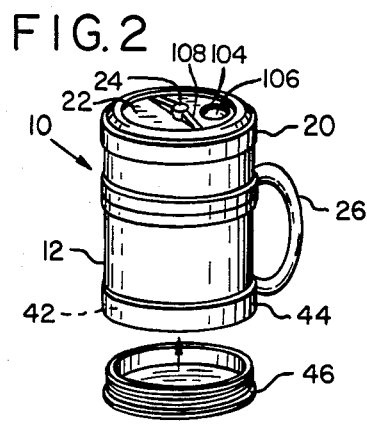
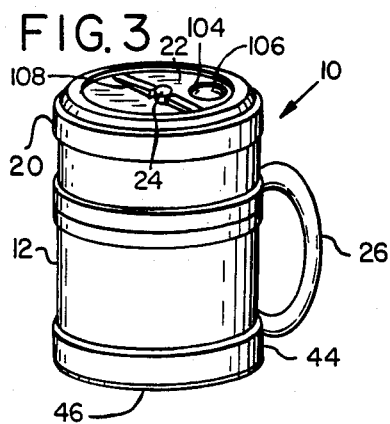
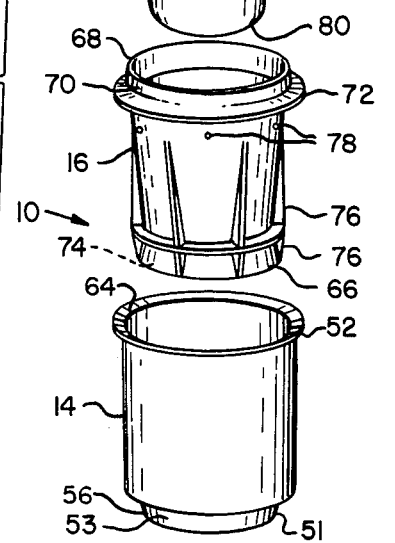
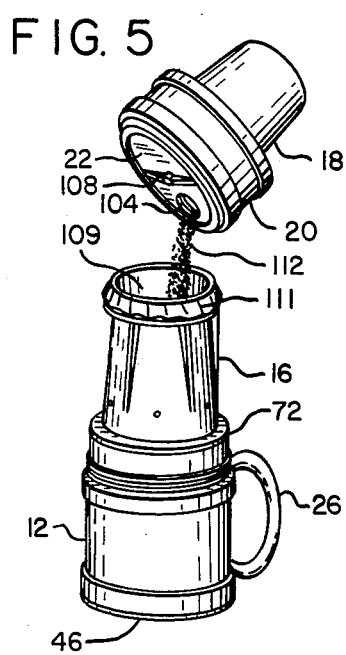
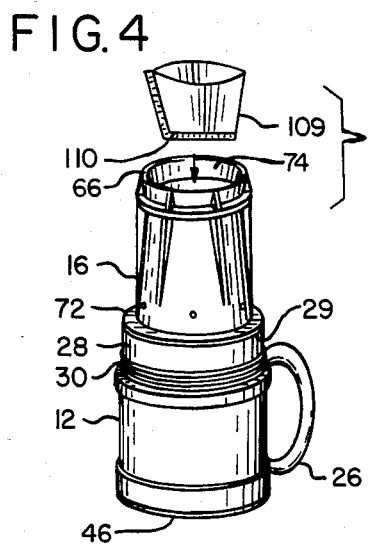
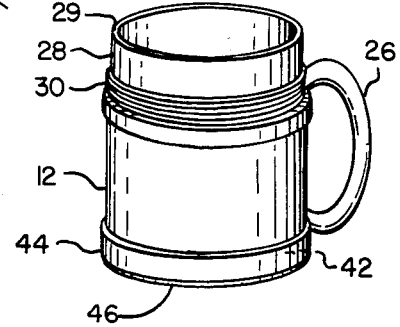
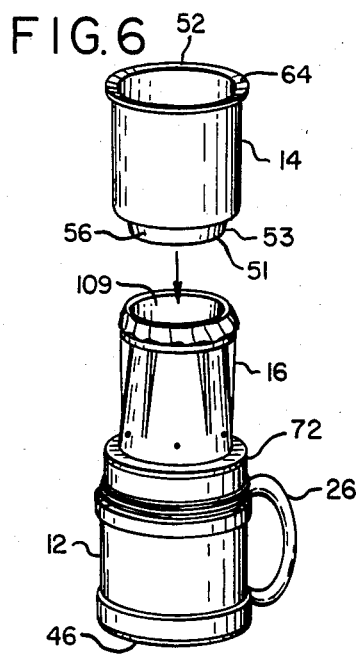
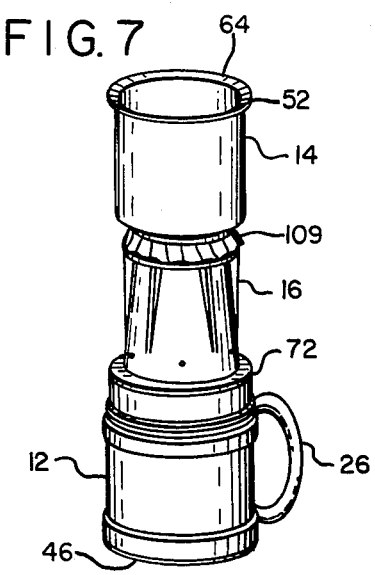

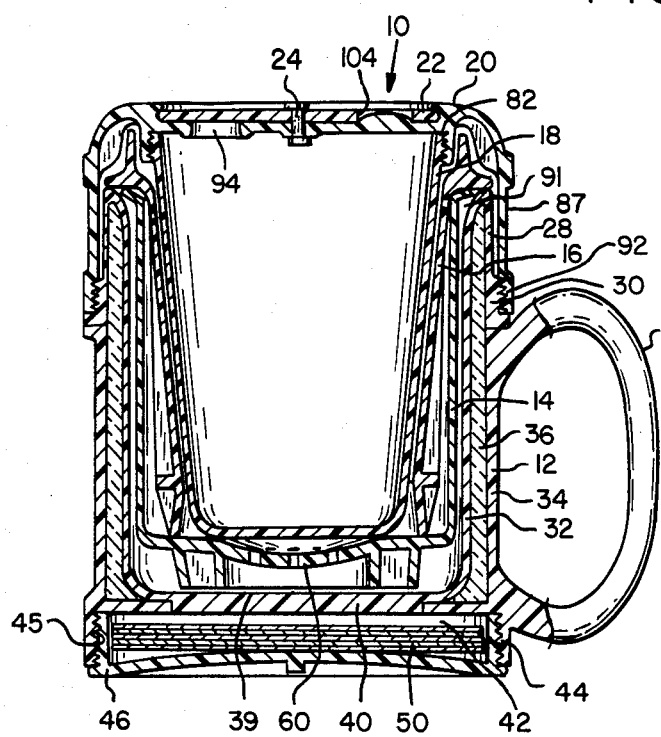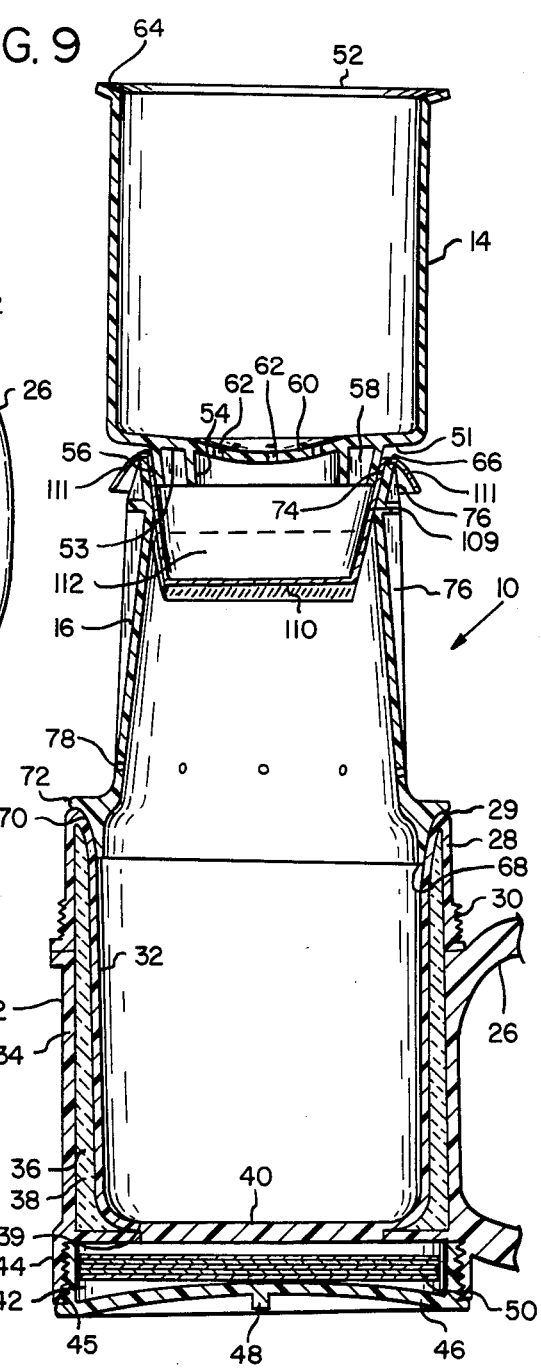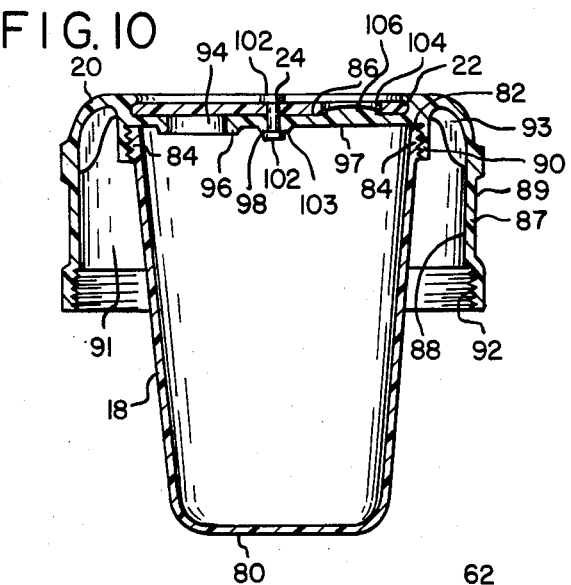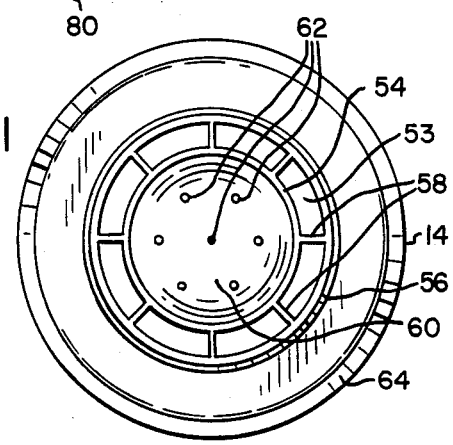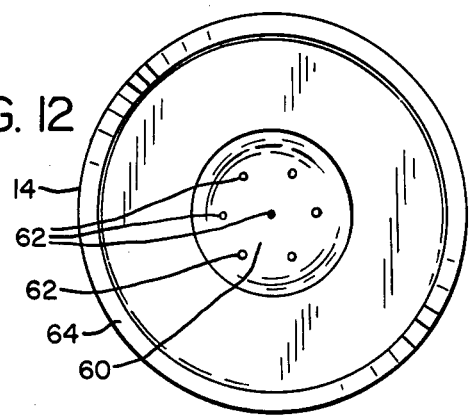

PORTABLE, NESTABLE BEVERAGE BREWING SYSTEM

BACKGROUND OF THE INVENTION

The present invention generally relates to beverage brewing systems, and more particularly to a beverage brewing system having a self-contained source of powdered beverage materials, and having components which nest to form a compact, portable unit.

A demand exists for compact, portable beverage brewing systems capable of producing a high quality brewed product with minimal effort. Such demand has increased in recent years through the introduction of new and tasteful varieties of coffee, tea, and other beverage materials. Many brewing systems have been developed to satisfy this demand. For example, U.S. Pat. No. 4,417,504 to Yamamoto describes a coffee brewing apparatus in which a paper filter is positioned on top of a conical filter basket. The filter basket is then placed in a substantially cylindrical case which is positioned on a cup. Heated water is then poured into the filter to begin the brewing process. When not in use, the cylindrical case may be inverted and secured to the top of the cup for transport.

U.S. Pat. No. 4,446,158 to English et al. describes a beverage making apparatus in which a disposable coffee container/filter unit is provided. The unit includes a portion of coffee sandwiched between two filter layers. The coffee and filters are secured together using a compartmentalized frame structure. The unit is positioned at the bottom of a substantially cylindrical receptacle having openings at the bottom. The receptacle is then placed on top of a cup-like base.

Another coffee brewing apparatus is shown in U.S. Pat. No. 4,069,751 to Gronwick et al. The Gronwick et al. apparatus includes a brewing basket and basket liner. A disposable filter and coffee are positioned between the brewing basket and basket liner to form a brewing unit. The brewing unit is then positioned on top of a receptacle to receive the brewed beverage.

U.S. Pat. No. 4,027,582 to O'Connell describes another coffee brewing system. The O'Connell system uses a cylindrical containment vessel to which coffee is added. After the addition of coffee, a flat partition member is placed on top of the coffee. Both the partition member and bottom of the cylindrical containment vessel have openings to permit fluid passage therethrough. The cylindrical containment vessel and partition member are then placed on top of a cup-like receiver. The invention also includes a lid for the cylindrical containment vessel, and a holder for the cup-like receiver to facilitate handling of the receiver when hot.

Another brewing system is shown in U.S. Pat. No. 3,695,168 to Van Brunt. The Van Brunt system includes a water receiving/brewing vessel having an open top with a tube-like bottom portion. The tube-like bottom portion functions as a coffee brewing chamber. The water receiving/brewing vessel is positionable on a base member which, in turn, is placed on a cup-like receiver for collecting the brewed beverage. To control water flow into the bottom chamber portion of the water receiving/brewing vessel, a water flow controller is provided. The water flow controller consists of a small cover with an elongate handle. The water flow controller is sized for placement within the coffee brewing chamber to control water flow therethrough.

Other patents relating to beverage brewing systems include U.S. Pat. Nos. 4,487,114 to Abdenour, 3,811,373 to Telco, and 3,822,013 to Van Der Veken. The Abdenour patent describes a brewing apparatus in the form of a cup having a substantially cylindrical brewing basket and lid on the top. Telco involves a beverage making device having a disposable filter/coffee unit comprising a frame structure having a portion of coffee sandwiched between upper and lower filter layers. The unit is positioned at the bottom of a container which is placed on a cup for receipt of the brewed beverage product. Van Der Veken involves an apparatus which includes a substantially cylindrical containment vessel sized for receiving a plurality of disc-like capsules containing powdered beverage materials. The containment vessel also functions as a water receiving vessel sized to receive one of the capsules in a manner permitting the passage of water therethrough for the brewing of a selected beverage.

The present invention represents an improvement over the above-described inventions. Specifically, a beverage brewing system is provided having its own self-contained dispensing canister for retaining a supply of powdered beverage materials therein. The invention also includes components which nest within a cup-like brewed beverage receiver to form a compact, portable unit. Specific benefits, advantages, and structural details of the invention are described herein below.

SUMMARY OF THE INVENTION

It is an object of the present invention to provide a beverage brewing system capable of producing a brewed beverage product with pleasing taste and aromatic characteristics.

It is another object of the present invention to provide a beverage brewing system which is inexpensive to manufacture and use.

It is another object of the present invention to provide a beverage brewing system having components which are easy to clean.

It is still another object of the present invention to provide a beverage brewing system of durable construction.

It is still another object of the present invention to provide a beverage brewing system having a self-contained supply of powdered beverage materials.

It is a further object of the present invention to provide a beverage brewing system having components nestable to form a compact, portable unit.

It is a further object of the present invention to provide a beverage brewing system having a cup-like receiving portion functioning as both a drinking cup and storage container for other components of the system.

It is a still further object of the present invention to provide a beverage brewing system having the capacity for storing a supply of disposable beverage brewing filters therein.

The above-described objects are attained by the present invention which comprises a portable, nestable brewing system for the preparation of various liquid beverage products. Specifically, the system includes as its main components, an insulated cup-like brewed beverage receiver, a water receiving vessel, a filter holder, and a powdered beverage storage canister. The brewed beverage receiver has an open top portion, closed bottom portion, and a chamber beneath the bottom portion with a detachable closure device to facilitate the storage of extra beverage filters therein. The filter holder includes a first open end, a second open end with a lip portion thereon, and a plurality of gas vent openings. The water receiving vessel has a first end having flow restriction means therein comprising a plurality of spaced bores, and an open second end. The powdered beverage storage canister includes a closed bottom portion, an open top portion, and a lid detachably securable to the open top portion. The lid includes flow control means for regulating the flow of powdered beverage materials from the canister.

To brew beverage materials using the present invention, the second open end and lip portion of the filter holder are positioned on the open top portion of the brewed beverage receiver. The lip portion of the filter holder facilitates proper seating of the filter holder on the brewed beverage receiver. Next, a filter is placed over the first open end of the filter holder, and powdered beverage materials are poured from the powdered beverage storage canister into the filter. To secure the filter in position, the first end of the water receiving vessel is engaged to the first end of the filter holder, securing the filter and powdered beverage materials therebetween. Finally, water is poured into the open second end of the water receiving vessel. The water passes through the flow restriction means in the first end, and is delivered in a controlled manner to the powdered beverage materials and filter. Thereafter, the brewed beverage product is collected in the brewed beverage receiver for consumption.

All components of the invention, as described above, are sized to nest within each other. Specifically, to store components of the device, the water receiving vessel is placed in the brewed beverage receiver, and the filter holder is placed in the water receiving vessel. Next, the powdered beverage storage canister is positioned in the filter holder within the brewed beverage receiver. The lid of the canister must be secured to the canister prior to the placement thereof in the filter holder. After placement of the canister in the brewed beverage receiver, the lid is secured to the open top portion of the brewed beverage receiver to form a compact, nested, portable unit.

These and other objects, advantages, and features of the invention will become apparent hereinafter from the following drawings, detailed description of a preferred embodiment, and claims.

BRIEF DESCRIPTION OF THE DRAWINGS

FIG. 1 is an exploded perspective view of the present invention showing all of its components in unnested form.

FIG. 2 is a perspective view of the present invention having all components in a nested arrangement, specifically showing the detachable cover member of the storage chamber at the bottom of the brewed beverage receiver.

FIG. 3 is a perspective view of the present invention having all components in a nested arrangement.

FIGS. 4–7 are perspective views of the present invention sequentially showing the manipulation of components required for brewing beverage materials using the invention.

FIG. 8 is a partial sectional view of the present invention showing all components in a nested arrangement.

FIG. 9 is a partial sectional view of the present invention showing all components arranged for the brewing of beverage materials.

FIG. 10 is a sectional view of the present invention showing the powdered beverage storage canister and attached lid.

FIG. 11 is a bottom view of the water receiving vessel of the present invention.

FIG. 12 is a top view of the water receiving vessel of the present invention.

DETAILED DESCRIPTION OF A PREFERRED EMBODIMENT

Structural Features

The present invention comprises a nestable, beverage brewing system of improved design and portability. The major components of a preferred embodiment of the invention 10 are shown in FIG. 1. These components include a brewed beverage receiver 12, water receiving vessel 14, filter holder 16, powdered beverage storage canister 18, canister lid 20, canister flow control disc 22, and disc fastener 24. All of these components, with the exception of disc fastener 24 and powdered beverage storage canister 18, can be manufactured using any injection moldable synthetic polymer material having a melting temperature in excess of 220° F. The powdered beverage storage canister 18 may be manufactured of either the above-described polymer or a corrosion-resistant metal such as stainless steel or aluminum. The disc fastener 24 may be made of the same corrosion-resistant metal as the powdered beverage storage canister 18.

Referring now to specific structural features of the above-described components, the brewed beverage receiver 12 is manufactured to resemble a drinking cup having a handle 26. With reference to FIGS. 1 and 9, the brewed beverage receiver 12 includes an open top portion 28 having a rim 29 and threaded portion 30, the function of which will be explained hereinafter.

The brewed beverage receiver 12 further comprises a cylindrical inner wall 32 secured to a cylindrical outer wall 34. The inner wall 32 is smaller in diameter than the outer wall 34, defining a heat-insulation area 36 therebetween, as shown in FIG. 9. It is desirable to fill the heat-insulation area 36 with insulation material 38, such as expanded plastic foam (e.g., expanded polystyrene plastic foam).

At the bottom 39 of the brewed beverage receiver 12 is a partition 40 for retaining the brewed beverage product within the brewed beverage receiver 12. Directly below the partition 40 is a storage chamber 42 defined by annular extension portion 44. The annular extension portion 44 comprises an internally threaded region 45 sized to engage a threaded cover member 46 having a handle portion 48. The storage chamber 42 is primarily designed for the storage of extra disposable filters 50 to be used in brewing beverages as described hereinafter.

The brewed beverage receiver 12 functions as both a drinking cup and storage container for the remaining components of the invention 10, as set forth below. The preferred volume capacity of the brewed beverage receiver 12 is approximately 12 fluid ounces. Likewise, the preferred overall height of the brewed beverage receiver 12 is about one inch taller than a standard 12 fluid ounce cup, with a diameter approximately equal to that of the standard cup.

With continued reference to FIGS. 1 and 9, the water receiving vessel 14 includes a first end 51 having flow restriction means therein, and an open second end 52. The first end 51 consists of an annular section 53, including inner reinforcing ring 54, mating surface 56, and a plurality of spaced reinforcement ribs 58 (FIGS. 9 and 11.) The first end 51 also includes a bottom partition 60 having a plurality of spaced bores 62 functioning as flow restriction means (FIGS. 9 and 12.) The use of seven bores 62, each being approximately ½ mm in diameter, will provide sufficient water flow control. However, the number of bores and the bore diameter may be varied, depending on the desired flow rate. Finally, as indicated above, the second end 52 is open, and further includes a reinforcing flange 64.

The filter holder 16 has a first open end 66 and second open end 68. The second open end 68 also includes external mating surface 70 and lip 72. The first open end 66 includes internal mating surface 74. Equally spaced about the exterior of the filter holder 16 are gas vent holes 78 and a plurality of structural reinforcing ribs 76.

Referring now to FIGS. 1 and 10, the invention 10 includes a powdered beverage storage canister 18, canister lid 20, canister flow control disc 22, and disc fastener 24. The powdered beverage storage canister 18 has a closed bottom 80, and an open top 82 including a threaded portion 84. The canister lid 20 comprises a top portion 86 and an annular, downwardly extending side portion 87 having an inner surface 88, outer surface 89, first internal threaded region 90, second internal threaded region 92, and a plurality of structural reinforcing ribs 93. The first threaded region 90 is adapted for threadable engagement with the threaded portion 84 of the open top 82 of the powdered beverage storage canister 18 to secure the powdered beverage storage canister 18 to the canister lid 20. The function of the second threaded region 92 will be described hereinafter. As shown in FIG. 10, the overall diameter of the canister lid 20 is greater than that of the open top 82 of the powdered beverage storage canister 18, defining a spaced region 91 therebetween, further described below.

The top portion 86 of the canister lid 20 has a pour opening 94, reinforcement section 96 adjacent the pour opening 94 on the underside 97 of the top portion 86, and an opening 98 for the disc fastener 24.

The canister flow control disc 22 is rotatably attached to the top portion 86 of the canister lid 20 using the disc fastener 24, as shown in FIG. 10. The flattened ends 102 of the disc fastener 24 retain the disc fastener 24 in position. The underside 97 of the top portion 86 includes a reinforcing section 103 adjacent opening 98 to ensure that the disc fastener 24 remains in position, as shown. The canister flow control disc 22 further comprises a pour opening 104 sustantially complementary in diameter to the pour opening 94 in the top portion 86 of the canister lid 20. Alignment of the pour openings 94 and 104 by rotation of the canister flow control disc 22 permits powdered beverage materials to be dispensed from the powdered beverage storage canister 18.

To maintain the canister flow control disc 22 in a storage position whereby the pour openings 94 and 104 are in disalignment, the canister flow control disc 22 is rotated until raised portion 106 on the top portion 86 is positioned within the pour opening 104 as shown in FIG. 10. Once in this position, the canister flow control disc 22 is locked and will not revert to a position where pour openings 94 and 104 are aligned without action by the user of the invention. Finally, the canister flow control disc 22 is rotated using finger manipulation ribs 108.

Brewing Configuration

To brew beverage materials using the invention 10, the second open end 68 of the filter holder 16 is positioned on the rim 29 of the open top portion 28 of the brewed beverage receiver 12. The filter holder 16 is positioned so that external mating surface 70 and lip 72 rest on the rim 29 of the brewed beverage receiver 12, as shown in FIGS. 4, 5, and 9.

Next, a conventional disposable filter 109 or the like removed from storage chamber 42 in the brewed beverage receiver 12 is positioned within the first open end 66 of the filter holder 16 to form a pouch-like portion 110 (FIGS. 4 and 9.) A suggested disposable filter usable in the invention is manufactured by the Melitta Company under the designation "1×1", although other types, including non-disposable versions, may be used. The outer edges 111 of the filter 109 should extend beyond the edges of the first open end 66, as shown in FIGS. 5 and 9.

A quantity of powdered beverage material 112 is then poured from the powdered beverage storage canister 18 into the pouch-like portion 110 of the filter 109. Powdered beverage materials usable in the invention include coffee, tea, and other popular drink mixes.

Thereafter, the annular section 53 of the water receiving vessel 14 is positioned within the first open end 66 of the filter holder 16 (FIG. 6.) This action engages the filter 109 between the internal mating surface 74 of the filter holder 16 and the mating surface 56 of the water receiving vessel 14. The resulting arrangement of components is as shown in FIGS. 7 and 9.

To complete the brewing process, heated water is poured into and through the open second end 52 of the water receiving vessel 14. The water then flows through spaced bores 62 in the bottom partition 60 of the water receiving vessel 14, through the powdered beverage material 112 and filter 109, with excess gas and steam being vented through gas vent holes 78 in the filter holder 16. The brewed beverage product is then collected in the brewed beverage receiver 12. The use of spaced bores 62 as a flow restriction means permits wetting of the powdered beverage materials in a controlled manner thereby ensuring the maximum extraction of flavors therefrom.

After consumption of the brewed product is completed, clean-up of the invention requires minimal effort. Used filters are disposed of by inverting the filter holder 16 over a waste bin. In most cases, it is not necessary to clean either the filter holder 16 or water receiving vessel 14 more than once in every 5–10 uses. Only the brewed beverage receiver 12 should be washed after each use. Washing also requires minimal effort, since most residue materials are trapped by the filter. Likewise, cleaning is facilitated by the synthetic polymer material used to construct the components of the invention 10 which permits minimal adhesion of contaminants and residue thereto.

Storage Configuration

An important feature of the present invention 10 is the nestability of its components, shown in FIG. 8. Specifically, powdered beverage storage canister 18 is sized to fit within filter holder 16 which is sized to fit within water receiving vessel 14. The water receiving vessel 14 and components nested therein all fit within the brewed beverage receiver 12. Thus, to store the invention 10, the water receiving vessel 14 is first placed within the brewed beverage receiver 12. Next, the filter holder 16 is placed within the water receiving vessel 14. Finally, after placement of the water receiving vessel 14 and filter holder 16 within the brewed beverage receiver 12, the powdered beverage storage canister 18 is then stored within the brewed beverage receiver 12 by placement inside the filter holder 16. Prior to the placement of the canister 18 inside the filter holder 16, the lid 20 must be attached to the canister 18. The resulting nested unit is shown in FIG. 8.

To retain the nested components within the brewed beverage receiver 12, the open top portion 28 of the brewed beverage receiver 12 is positioned within the spaced region 91 between the downwardly extending side portion 87 of the canister lid 20 and the open top 82 of powdered beverage storage canister 18. The open top portion 28 of the brewed beverage receiver 12 is then threadably engaged to the canister lid 20 using threaded region 92 on the inner surface 88 of canister lid 20, and threaded portion 30 on the top portion 28 of the brewed beverage receiver 12, as shown in FIG. 8. In nested form, the water receiving vessel 14 is seated within the brewed beverage receiver 12 adjacent partition 40. In a similar manner, the powdered beverage storage canister 18 and filter holder 16 are both seated within the water receiving vessel 14 adjacent the bottom partion 60.

Although the present invention is ideal for home use, it may be used to provide fresh coffee and specialty brewed beverages in a variety of situations where the use of large, elaborate brewing equipment would not be practical. Such situations involve office use, camping, and boating excursions. Furthermore, the invention allows the user to select a desired type and blend of beverage. The use of a self-contained powdered beverage storage canister and readily available commercial filters permits the user to select his preferred beverage. The user is not dependent on pre-packaged, one-portion beverages.

While one embodiment of the invention has been disclosed herein, it will be appreciated that modifications of the above-described embodiment of the invention may be resorted to without departing from the scope of the invention. For example, variations falling within the scope of the invention include those involving the types and dimensions of materials used, and the means for fastening components of the invention together. Accordingly, the scope of the invention is to be determined from the claims set forth as follows.

I claim:

1. A portable, nestable beverage brewing system comprising:
    a water receiving vessel;
    a filter holder having first and second ends, said first end being sized to detachably engage said water receiving vessel during the brewing of said beverage, said filter holder being adapted to retain a filter between said filter holder and said water receiving vessel;
    a brewed beverage receiver sized to detachably engage said second end of said filter holder during the brewing of said beverage, said brewed beverage receiver also being sized to receive and retain therein said water receiving vessel and filter holder;
    a powdered beverage storage canister sized for receipt within said brewed beverage receiver after the receipt of said water receiving vessel and filter holder within said brewed beverage receiver; and
    locking means for maintaining said water receiving vessel, filter holder, and powdered beverage storage canister within said brewed beverage receiver.

2. The portable, nestable beverage brewing system of claim 1 wherein said brewed beverage receiver comprises an open top portion and a closed bottom portion.

3. The portable, nestable beverage brewing system of claim 2 wherein said powdered beverage storage canister comprises a closed bottom portion, open top portion, and a lid detachably securable to said open top portion.

4. The portable, nestable beverage brewing system of claim 3 wherein said lid further comprises a top portion, a downwardly extending annular side portion having an inner and outer surface, a powdered beverage pour opening in said top portion of said lid, and a flow control member rotatably secured to said top portion of said lid for selectively controlling the flow of powdered beverage materials through said powdered beverage pour opening.

5. The portable, nestable beverage brewing system of claim 4 wherein said flow control member comprises a rotatable disc member having an opening therein, the rotation of said disc member and alignment of said opening in said disc member with said beverage pour opening in said top portion of said lid permitting powdered beverage materials to be poured from said powdered beverage storage canister, and the disalignment of both of said openings preventing powdered beverage materials from being poured from said powdered beverage storage canister, said disc member further comprising lock means for securing said disc member in a disalignment position.

6. The portable, nestable beverage brewing system of claim 5 wherein said lock means comprises a raised portion on said top portion of said lid, said raised portion sized for receipt within said opening in said disc member.

7. The portable, nestable beverage brewing system of claim 4 wherein the diameter of said lid is greater than the diameter of said open top portion of said powdered beverage storage canister so that when said lid is secured to said open top portion, a spaced region is formed between said open top portion and said downwardly extending annular side portion of said lid.

8. The portable, nestable beverage brewing system of claim 7 wherein said locking means comprises means for securing said lid of said powdered beverage storage canister to said open top portion of said brewed beverage receiver.

9. The portable, nestable beverage brewing system of claim 8 wherein said means for securing said lid of said powdered beverage storage canister to said open top portion of said brewed beverage receiver comprises first and second matingly engagable threaded portions, said first threaded portion located on said inner surface of said downwardly extending annular side portion of said lid, and said second threaded portion located on said open top portion of said brewed beverage receiver, said brewed beverage receiver being secured to said lid by the placement of said open top portion of said brewed beverage receiver within said spaced region between said open top portion of said powdered beverage storage canister and said downwardly extending annular side portion of said lid, and the mating engagement of said first and second threaded portions thereafter.

10. The portable, nestable beverage brewing system of claim 2 wherein said second end of said filter holder is open to permit the passage of water therethrough, and includes a lip sized for engagement with the open top portion of said brewed beverage receiver.

11. The portable, nestable beverage brewing system of claim 1 wherein said water receiving vessel comprises a first end having flow restriction means therein, and an open second end.

12. The portable, nestable beverage brewing system of claim 11 wherein said flow restriction means of said first end of said water receiving vessel comprises a plurality of spaced bores.

13. The portable, nestable beverage brewing system of claim 11 wherein said first end of said filter holder is open to permit the passage of water therethrough, said first end being sized to engage said first end of said water receiving vessel therein.

14. The portable, nestable beverage brewing system of claim 1 wherein said filter holder comprises a plurality of gas vent openings therethrough.

15. The portable, nestable beverage brewing system of claim 1 wherein said brewed beverage receiver is in the form of a cup having an open top portion, a closed bottom portion, a cylindrical inner wall, and a cylindrical outer wall of greater diameter than that of said inner wall, said outer wall being spaced from said inner wall to define a heat insulation area therebetween.

16. The portable, nestable beverage brewing system of claim 15 wherein said brewed beverage receiver further comprises a handle member secured to said outer wall.

17. The portable, nestable beverage brewing system of claim 15 wherein said heat insulation area is filled with expanded plastic foam.

18. The portable, nestable beverage brewing system of claim 2 wherein said brewed beverage receiver further comprises a storage chamber beneath said closed bottom portion, and a cover member detachably securable to said storage chamber for the sealing thereof, said storage chamber being adapted to retain a plurality of beverage filters therein.

19. The portable, nestable beverage brewing system of claim 3 wherein said powdered beverage storage canister is sized for receipt within said filter holder, said filter holder sized for receipt within said water receiving vessel, and said water receiving vessel sized for receipt within said brewed beverage receiver so as to form a nested unit, said locking means comprising means for securing said lid of said powdered beverage storage canister to said open top portion of said brewed beverage receiver so as to maintain said nested unit in such a condition during the transport thereof.

20. A portable, nestable beverage brewing system comprising:
   a water receiving vessel;
   a filter holder having first and second ends, said first end being sized to detachably engage said water receiving vessel during the brewing of said beverage, said filter holder being adapted to retain a filter between said filter holder and said water receiving vessel;
   a brewed beverage receiver comprising an open top portion and a closed bottom portion, said brewed beverage receiver being sized to detachably engage said second end of said filter holder during the brewing of said beverage, said brewed beverage receiver also being sized to receive and retain therein said water receiving vessel and filter holder;
   a powdered beverage storage canister comprising a closed bottom portion, open top portion, and a lid detachably securable to said open top portion, said lid comprising a downwardly extending annular side portion having an inner and outer surface, the diameter of said lid being greater than the diameter of said open top portion of said powdered beverage storage canister so that when said lid is secured to said open top portion, a spaced region is formed between said open top portion of said powdered beverage storage canister and said downwardly extending annular side portion of said lid, said powdered beverage storage canister being sized for receipt within said brewed beverage receiver after the receipt of said water receiving vessel and filter holder within said brewed beverage receiver; and
   locking means for securing said open top portion of said brewed beverage receiver within said spaced region and to said lid so as to retain said water receiving vessel, filter holder, and powdered beverage storage canister within said brewed beverage receiver.

21. The portable, nestable beverage brewing system of claim 20 wherein said locking means comprises first and second matingly engagable threaded portions, said first threaded portion located on said inner surface of said downwardly extending annular side portion of said lid, and said second threaded portion located on said open top portion of said brewed beverage receiver, said brewed beverage receiver being secured to said lid by the placement of said open top portion of said brewed beverage receiver within said spaced region between said open top portion of said powdered beverage storage canister and said downwardly extending annular side portion of said lid, and the mating engagement of said first and second threaded portions thereafter.

22. A portable, nestable beverage brewing system comprising:
   a water receiving vessel;
   a filter holder having first and second ends, said first end being sized to detachably engage said water receiving vessel during the brewing of said beverage, said filter holder being adapted to retain a filter between said filter holder and said water receiving vessel;
   a brewed beverage receiver sized to detachably engage said second end of said filter holder during the brewing of said beverage, said brewed beverage receiver also being sized to receive said water receiving vessel, said water receiving vessel being sized to receive said filter holder; and
   a powdered beverage storage canister and a lid detachably securable thereto, said powdered beverage storage canister being sized for receipt within said filter holder after the receipt of said filter holder within said water receiving vessel and the receipt of said water receiving vessel within said brewed beverage receiver, said powdered beverage storage canister, filter holder, and water receiving vessel within said brewed beverage receiver forming a nested unit, said lid of said powdered beverage storage canister further comprising locking means for securing said lid of said powdered beverage storage canister to said brewed beverage receiver so as to maintain said nested unit in such a condition during the transport thereof.

* * * * *